(12) United States Patent
Oh

(10) Patent No.: US 10,272,353 B2
(45) Date of Patent: Apr. 30, 2019

(54) UNIT BLOCK HAVING INTEGRALLY PROVIDED COUPLING PORTION AND INSERTION PORTION AND COUPLING OR USING METHOD USING SAME

(71) Applicant: Seung Young Oh, Seoul (KR)

(72) Inventor: Seung Young Oh, Seoul (KR)

( * ) Notice: Subject to any disclaimer, the term of this patent is extended or adjusted under 35 U.S.C. 154(b) by 0 days.

(21) Appl. No.: 15/575,382

(22) PCT Filed: Nov. 24, 2016

(86) PCT No.: PCT/KR2016/004530
§ 371 (c)(1),
(2) Date: Nov. 19, 2017

(87) PCT Pub. No.: WO2016/186339
PCT Pub. Date: Nov. 24, 2016

(65) Prior Publication Data
US 2018/0154276 A1    Jun. 7, 2018

(30) Foreign Application Priority Data

May 19, 2015    (KR) .................. 10-2015-0070015
Jun. 8, 2015    (KR) .................. 10-2015-0080553

(51) Int. Cl.
*A63H 33/08*    (2006.01)
*A63H 33/10*    (2006.01)
(Continued)

(52) U.S. Cl.
CPC ............ *A63H 33/107* (2013.01); *A63B 1/00* (2013.01); *A63B 9/00* (2013.01); *A63B 17/04* (2013.01); *A63B 23/1218* (2013.01); *A63B 63/083* (2013.01); *A63G 11/00* (2013.01); *A63G 21/00* (2013.01); *A63G 21/02* (2013.01); *A63G 31/00* (2013.01); *A63H 33/008* (2013.01);
(Continued)

(58) Field of Classification Search
CPC .. A63B 1/00; A63B 9/00; A63B 17/04; A63B 23/1218; A63B 63/083; A63G 11/00; A63G 21/00; A63G 21/02; A63G 31/00; A63H 33/008; A63H 33/108; A63H 33/12
USPC .................. 446/117, 122, 124, 125, 126
See application file for complete search history.

(56) References Cited

U.S. PATENT DOCUMENTS 3,005,282 A    10/1961    Christiansen
3,034,254 A    5/1962     Christiansen
(Continued)

FOREIGN PATENT DOCUMENTS

| KR | 10-2013-0105158 A | 9/2013 |
|----|-------------------|--------|
| KR | 10-1356588 B1     | 2/2014 |
| KR | 10-1447679 B1     | 10/2014 |
| WO | 1997/01383 A1     | 7/1997 |

*Primary Examiner* — Vishu K Mendiratta
(74) *Attorney, Agent, or Firm* — Maschoff Brennan

(57) ABSTRACT

The present invention relates to a unit block having a coupling portion and an insertion portion provided in special structure and shape such that, instead of providing an assembly-type toy that makes a user build an assembly-type completed product according to the manual, the user is enabled to implement various articles by exercising creativity without feeling bored. The present invention provides a unit block, which has integrally provided coupling and insertion portions, and provides, as a means for using the same when a desired object is to be implemented.

4 Claims, 15 Drawing Sheets

(51) Int. Cl.
- *A63H 33/12* (2006.01)
- *A63B 1/00* (2006.01)
- *A63B 9/00* (2006.01)
- *A63B 17/04* (2006.01)
- *A63B 23/12* (2006.01)
- *A63B 63/08* (2006.01)
- *A63G 11/00* (2006.01)
- *A63G 21/02* (2006.01)
- *A63H 33/00* (2006.01)
- *A63G 21/00* (2006.01)
- *A63G 31/00* (2006.01)
- *B62B 3/00* (2006.01)
- *B62B 5/06* (2006.01)

(52) U.S. Cl.
CPC .......... *A63H 33/108* (2013.01); *A63H 33/12* (2013.01); *B62B 3/00* (2013.01); *B62B 5/06* (2013.01)

(56) References Cited

U.S. PATENT DOCUMENTS

| | | | |
|---|---|---|---|
| 3,597,875 A | 8/1971 | Christiansen | |
| 5,938,497 A * | 8/1999 | Mott | A63H 33/10 446/122 |
| 5,957,744 A * | 9/1999 | Mott | A63H 33/105 446/122 |
| 6,450,853 B1 * | 9/2002 | Larws | A63H 33/101 446/122 |
| 7,736,211 B2 * | 6/2010 | Marzetta | A63H 33/106 446/113 |
| 2003/0203702 A1 | 10/2003 | Germerodt et al. | |
| 2009/0017715 A1 * | 1/2009 | Grichting | A63H 33/105 446/124 |
| 2010/0210173 A1 * | 8/2010 | Maggiore | A63H 33/062 446/127 |
| 2012/0135665 A1 * | 5/2012 | Azmani | A63H 33/105 446/127 |

* cited by examiner

UNIT BLOCK HAVING INTEGRALLY PROVIDED COUPLING PORTION AND INSERTION PORTION AND COUPLING OR USING METHOD USING SAME

TECHNICAL FIELD

The present invention relates to a stackable assembly unit block, and more particularly, to a unit block that has a coupling portion and an insertion portion which are integrally provided such that the insertion portion is narrowed inward at the upper end of the coupling portion so as to have a size capable of being inserted into the coupling portion, wherein the four side surfaces of the coupling portion and the insertion portion are provided with a circular coupling through hole, a partial expanding portion is formed on upper, lower, left and right sides of the circular coupling through hole, and the inner expanding recess is provided in the center portion of the coupling portion, such that the unit block can be employed as a toy building block for children in a kindergarten, used for elementary school students to assemble various shapes such as furniture and buildings, or used for middle and high school students to build and play with a horizontal bar structure or a wall riding workout machine, and a method of coupling or using the same.

BACKGROUND ART

Generally, toys that can be assembled into various shapes and disassembled are called construction toys. The materials that make up the assembled toys include paper, wood, metal, and plastic and so on.

Children of 2 or 3 years old begin to play by arranging or stacking things. To enhance and raise their creativity, various assembly pieces are employed in types of play such as stacking, fitting, puzzle, clay play, and shape building with sorghum straws. Assembly pieces to be fitted to build shapes of vehicles such as trains and cars and buildings have also been proposed.

Most infant toys are construction toys, and they are widely used as kindergarten play materials. For children over six years old, plastic toys, model airplanes, and elaborate electric locomotives have been proposed. For example, U.S. Pat. Nos. 3,005,282, 3,034,254, and 3,597,875 disclose toy building bricks that can be stacked in multiple layers. International Patent Application Publication No. WO 1997/01383 discloses a construction toy in which a plurality of square building blocks and triangular building blocks having the same groove on the side surfaces thereof are integrally connected to each other with connecting elements using the symmetrical cross sections.

Korean Patent Application Publication No. 10-2013-0105158 discloses a ready-to-assemble child care room for playing including a plurality of corrugated cardboard side members formed in a rectangular shape or a square shape to form a coupling protrusion at one side thereof and a coupling groove at the other side thereof and having a roof coupling projection to be coupled with a first roof coupling groove of a corrugated cardboard roof member on the upper side, a corrugated cardboard front member formed in a rectangular shape or a square shape so as to have a triangular pyramid shape at an upper side thereof and including a roof coupling protrusion formed on one side and the other side of the upper portion so as to be coupled to a second roof coupling groove of the corrugated cardboard roof member, a coupling protrusion formed on one side of the lower portion, and a coupling groove formed on the other side of the lower potion, the corrugated cardboard front member having a hinged door at the center thereof, a corrugated cardboard rear member formed in a rectangular shape or a square shape so as to have a triangular pyramid shape at an upper side thereof and including a roof coupling protrusion formed on one side and the other side of the upper portion so as to be coupled to the second roof coupling groove of the corrugated cardboard roof member, a coupling protrusion formed on one side of the lower portion, and a coupling groove formed on the other side of the lower potion, the corrugated cardboard front member having a window door at the center thereof, and a corrugated cardboard roof member formed in a rectangular shape with a roof folding line from one side of the central portion thereof to the other side and including a first roof coupling groove formed at one side and the other side opposite to the roof folding line to accommodate the roof coupling protrusions of the corrugated cardboard side members and a plurality of second roof coupling grooves symmetrically formed on the upper and lower sides of the roof folding line, wherein the room is completed using a plurality of corrugated roof members having grooves and a plurality of corrugated cardboard members having coupling protrusions and coupling grooves on the outer edges of the corrugated members.

However, as described above, the conventional toys and an assembled product that is assembled using several parts according to a manual are configured to realize stereotypical shapes, and seldom allow children or students to use their ideas to creatively build an toy assembly. Further, once children or students learn the assembly principle after playing with the toys a couple of times, they are likely to become bored.

DISCLOSURE

Technical Problem

It is an object of the present invention to provide a unit block that includes a coupling portion and an insertion portion, which are formed in special structures and shapes, and is provided with various accessories for coupling the coupling portion and the insertion portion, such that users can creatively implement various objects without feeling bored rather than building an toy assembly as instructed in the manual.

It is another object of the present invention to provide a unit block that has a special structure capable of increasing coupling strength when unit blocks are vertically coupled or horizontally coupled rather than simply allowing repetition of assembly and disassembly of unit blocks as in conventional cases, such that users can build and play with a practical toy or actually apply the assembled toy to physical workout using various accessory parts, and a method of coupling or using the same.

Technical Solution

The unit block provided in the present invention can be used for an infant assembly product for children, or an assembly toy allowing elementary school students to build various shapes, or a building block which youths can use to build a rock climbing ramp. It can also be used for other buildings, furniture, equipment, vehicles, or the like.

In accordance with one aspect of the present invention, provided is a unit block including a coupling portion and an insertion portion integrally coupled to be used, wherein the insertion portion is narrowed by an outer wall of the coupling portion and integrally fitted into an upper end of the coupling portion, wherein four side surfaces of each of the coupling portion and the insertion portion are provided with a circular coupling through hole, a partially expanded tubular portion is formed on upper, lower, left, and right sides of the coupling through hole, and an internally extended groove is formed in a central portion of an outer surface of the coupling portion. Using the unit block, various shapes or structures can be provided.

In accordance with another aspect of the present invention, provided is a method of coupling a unit block having a coupling portion and an insertion portion integrated with each other, the insertion portion being narrowed by an outer wall of the coupling portion so as to be integrally fitted into an upper end of the coupling portion, four side surfaces of each of the coupling portion and the insertion portion being provided with a coupling through hole having a part provided with a partial protrusion, and a central portion of a surface of the coupling portion being provided with a "⊣"-shaped internally extended groove, the method including vertically coupling the unit block to another unit block, the vertically coupling includes fitting a "⊣"-shaped or H-shaped coupling support segment into the "⊣"-shaped internally extended groove formed in the surface of the coupling portion to strengthen the vertical coupling of the unit block to the other unit block. Alternatively, provided is a method of coupling a unit block having a coupling portion and an insertion portion integrated with each other, the insertion portion being narrowed by an outer wall of the coupling portion so as to be integrally fitted into an upper end of the coupling portion, and four side surfaces of each of the coupling portion and the insertion portion being provided with a circular coupling through hole having a partially expanded tubular portion formed on upper, lower, left, and right sides thereof, the method including horizontally coupling the unit block to another unit block using a support rod having a partially projecting portion formed on a surface thereof, wherein the coupling includes fitting the partially projecting portion formed on the surface of the support rod into the partially expanded tubular portion formed in the coupling through hole of the coupling portion to strengthen coupling therebetween.

In accordance with yet another aspect of the present invention, provided is a method of using a unit block having a coupling portion and an insertion portion integrated with each other, the insertion portion being narrowed by an outer wall of the coupling portion so as to be integrally fitted into an upper end of the coupling portion, four side surfaces of each of the coupling portion and the insertion portion being provided with a circular coupling through hole having a partially expanded tubular portion formed on upper, lower, left, and right sides thereof, and a central portion of a surface of the coupling portion being provided with a "⊣"-shaped internally extended groove, the method including vertically coupling the unit block to another unit block by fitting a "⊣"-shaped support segment or an H-shaped support segment into the "⊣"-shaped internally extended groove formed in the surface of the coupling portion, and horizontally coupling the unit block to another unit block by fitting a partially projecting portion formed on a surface of a support rod into the partially expanded portion formed in the coupling through hole of the coupling portion to secure high coupling strength.

Other aspects of embodiments of the technical idea of the present disclosure will be described in detail below with reference to the drawings.

Advantageous Effects

According to the present invention, it is expected that domestic toy products will not only replace imported foreign toy products for enhancing creativity including infant intelligence development games but also be exported to foreign countries.

A review of foreign importers of Korean toys reveals that many of the assembled toys are not robust and are easily broken. The unit block provided in the present invention prevents the assembly from being broken and enhances coupling with another block. Accordingly, the unit block may be used not only for a toy but also for a physical athletic facility for middle school and high school students.

When being connected with existing building blocks and building block fasteners, the unit block provided in the present invention may stably form various structures and arrangements and be used as a material that enhances aesthetics of the building blocks.

BEST MODE

Figure 3:
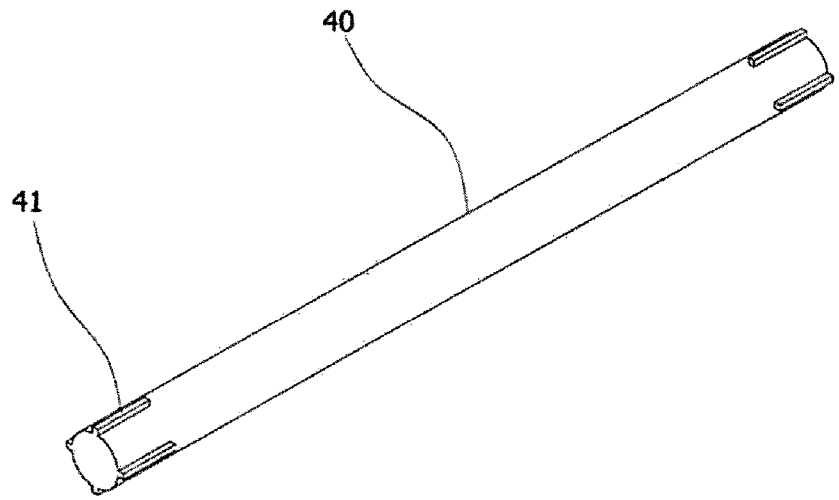
Figure 4:
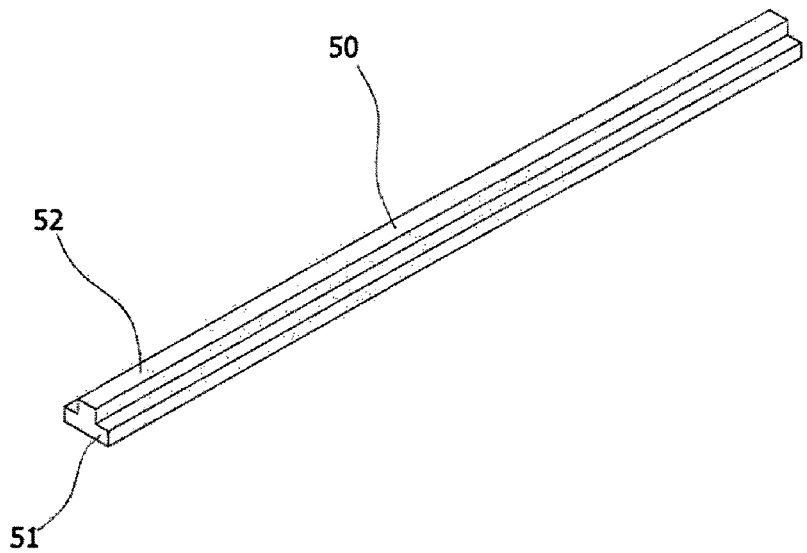
Figure 5:
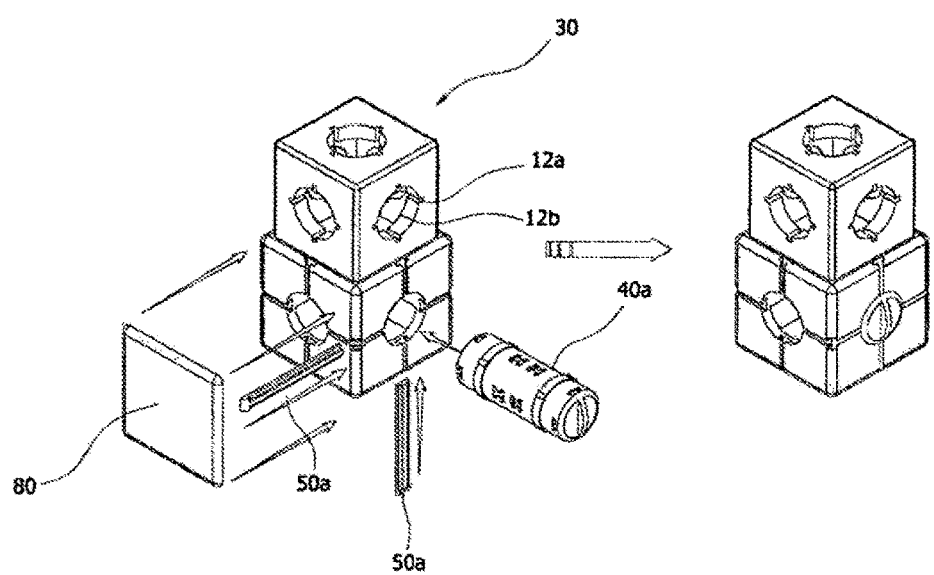
FIGS. 5 and 6 are views illustrating a unit block sample product and an auxiliary coupling component according to an embodiment to which the technical idea of the present disclosure is applied.
Figure 6:
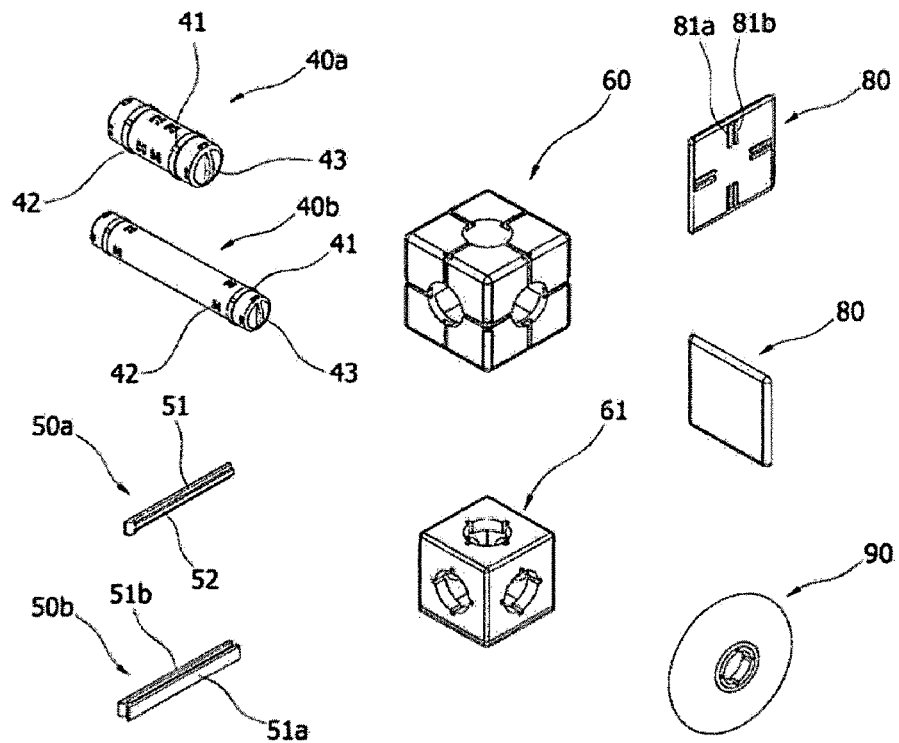

FIGS. 1 to 4 are perspective views of a unit block 30 and related components for coupling of the unit blocks, and FIGS. 5 and 6 show application examples of partial vertical coupling and horizontal coupling of the unit block 30 shown in FIGS. 1 to 4. FIGS. 7 to 17 show application examples of implementation of various articles through coupling of the unit block 30 and the related coupling components according to the present invention.

Figure 1:
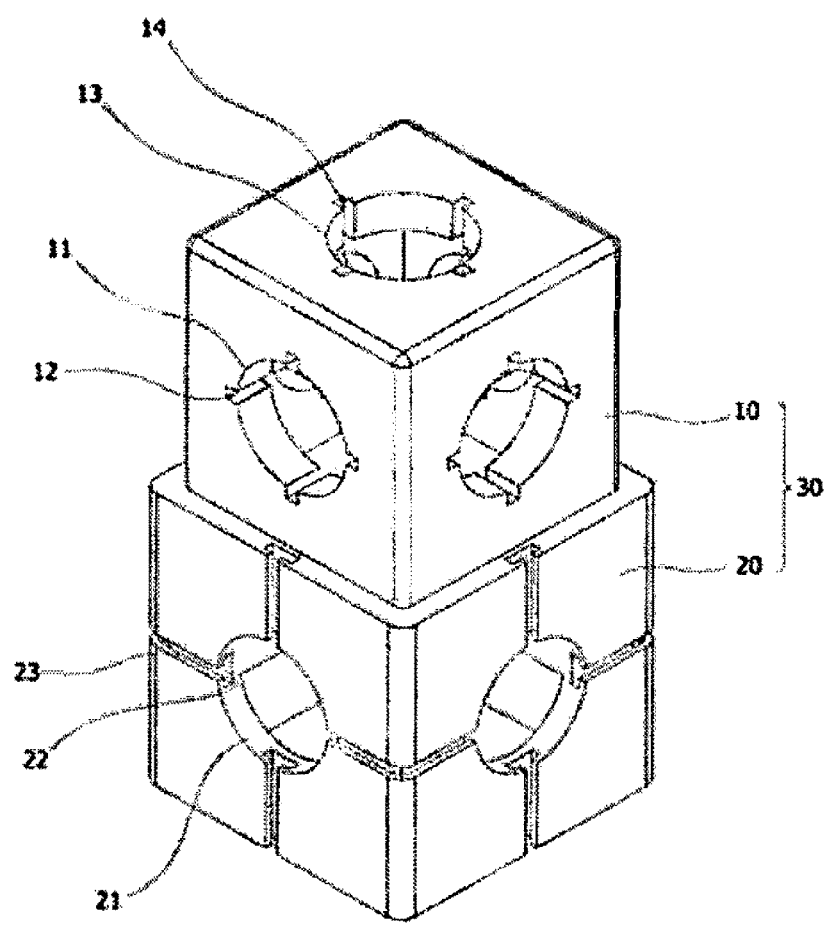
FIGS. 1 to 4 are views illustrating a unit block to which the technical idea of the present disclosure is applied.
Figure 2:
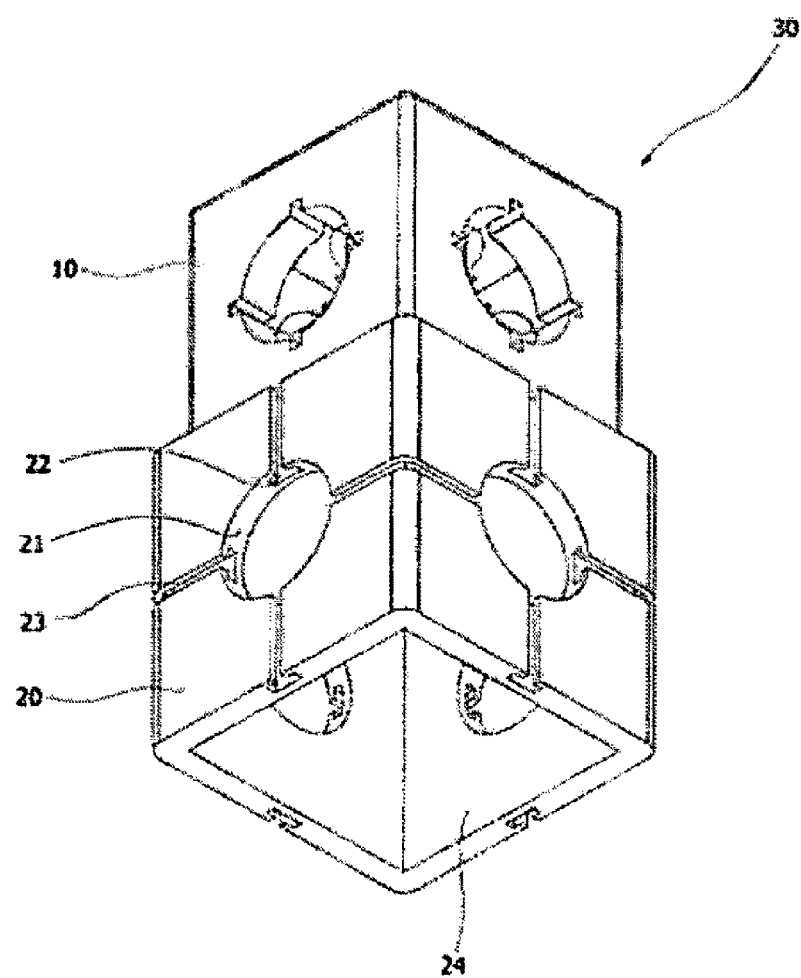

FIG. 1 is a side perspective view of the unit block 30 according to the technical idea of the present disclosure, and FIG. 2 is a bottom side perspective view showing a bottom surface of the unit block 30. FIG. 3 is a view showing a coupling support 40 arranged through the side surfaces of the unit block 30 of the present invention to couple a plurality of unit blocks, and FIG. 4 is a perspective view showing an auxiliary coupling pin 50 for coupling side portions of the unit blocks 30 of the present invention.

The unit block 30 includes a lower body 20 and an upper body 10, which are integrally provided so as to assemble a desired object in a stacking manner. Referring to the perspective view of FIG. 1, the lower body 20 of the unit block 30 functions as a coupling portion, and the upper body 10 functions as an insertion portion. When the upper body 10, which is the insertion portion, is fitted into the lower body 20, which is the coupling portion, the upper body 10 is narrowed in all direction by the thickness of the outer wall of the lower body 20 and thus integrated with the lower body 20. The four side surfaces of the lower body 20 are provided with a coupling through hole 21. The upper, lower, left and right sides of the coupling through hole 21 are provided with an internally extended groove 22, which has a "⊣" shape, and an elongated groove 23. The four side surfaces of the upper body 10, which is an insertion portion, are provided with a coupling through hole 11. The upper, lower, left and right sides of the coupling through hole are provided with a partially expanded tubular portion 12. The top surface of the upper body 10 is also provided with a coupling through hole 13 and a partially expanded tubular portion 14.

In FIG. 2, the bottom surface of the unit block 30 has a hollow portion 24, which allows the upper body 10 of another unit block 30 to be inserted thereinto to be coupled to the unit block 30.

In FIG. 3, both ends of the coupling support 40 are respectively provided with four partially projecting portions 41. For example, the partially projecting portions 41 may be fitted into the internally extended grooves 22 of the coupling through holes 21 arranged through the side surfaces of multiple unit blocks 30, thereby strengthening coupling of the unit blocks.

FIG. 4 is a perspective view of the auxiliary coupling pin 50 for coupling the side portions of the unit blocks 30. In this embodiment, the auxiliary coupling pin 50 includes a wide protrusion 51 and a narrow protrusion. When the unit blocks 30 are horizontally or vertically coupled to each other, the wide protrusion 51 and narrow protrusion of the auxiliary coupling pin 50 are fitted into the internally extended grooves 22, which have the "⊣" shape and are provided to the upper, lower, left and right sides of the coupling through hole 21, thereby strengthening coupling between the unit blocks.

FIGS. 5 and 6 are views illustrating a unit block sample product and an auxiliary coupling component according to an embodiment to which the technical idea of the present disclosure is applied, which are prepared to check whether the unit block article is applicable in reality. FIG. 5 schematically illustrates that one unit block 30 is provided with the insertion portion and the coupling portion integrated with each other, the insertion portion is inserted into the upper end of the coupling portion by being narrowed by the thickness of the outer wall of the coupling portion, and the four side surfaces of the coupling portion and the insertion portion are provided with a coupling through hole, which has a partially expanded tubular portion of a dual structure on the upper, lower, left and right sides. The coupling through hole on the outside of the unit block has a groove 12a, which extends outward, and a partially projecting portion 12b on the inside thereof, the unit coupling support 40a for one stage, which is configured to be applied to one unit block, includes a partially projecting portion 41, which is fitted into the groove 12a formed in the coupling through hole of the unit block, the partially projecting portion 12b on the inside of the unit block is fitted into the groove 42 of the unit coupling support 40a and may be applied to form a dual coupling structure, a short auxiliary coupling pin 50a is fitted into the elongated grooves 23 formed on the four side surfaces of the lower body 20, which is the coupling portion, and one side wall of the unit block 30 is covered by a decorative cover 80.

FIG. 6 exemplarily shows components of various shapes which may be used for the unit block 30 according to the technical idea of the present disclosure to form various types of articles. The upper left side of the figure shows the unit coupling support 40a for one stage which is configured to be fitted into the coupling through hole of one unit block 30. The unit coupling support 40a includes a partially projecting portion 41 and a groove 42. The second element shown on the upper left side of the figure is a unit coupling support 40b for two stages, which is configured to be fitted into the coupling through holes of two unit blocks 32 to couple the unit blocks 30. The unit coupling support 40b includes a partially projecting portion 41 and a groove 42. The third element shown on the left side of the figure is a short auxiliary coupling pin 50a coupled to the internally extended groove 22 of the unit block 30 that has a "⊣" shape. The element shown on the bottom left side is a coupling support segment 50b that has an "H" shape and is coupled to the internally extended grooves 22 of two unit blocks 30 when the two unit blocks 30 are coupled to each other. The element shown at the middle top of the figure is an upper finishing block 60 that is fitted onto the upper body 10 at the top of the unit block in the finishing operation. The element shown at the middle bottom of the figure is a lower finishing block 61 that is fitted into the lower body 20 at the bottom of the unit block in the finishing operation. The decorative cover 80 used to seal one side wall of the unit block 30 is shown at the top left of the figure. The decorative cover 80 has two convex portions 81a and 81b forming inclined surfaces inward and a flat surface on the outer side. The element shown on the bottom right side of the figure is a wheel structure 90 used for an article implemented with the unit blocks.

The components shown in FIG. 6 are means used to check articles that can be built using the unit block 30 provided according to the technical idea of the present invention. The figure shows one sample product. It is apparent that any article can be built using a finite number of components.

Figure 7:
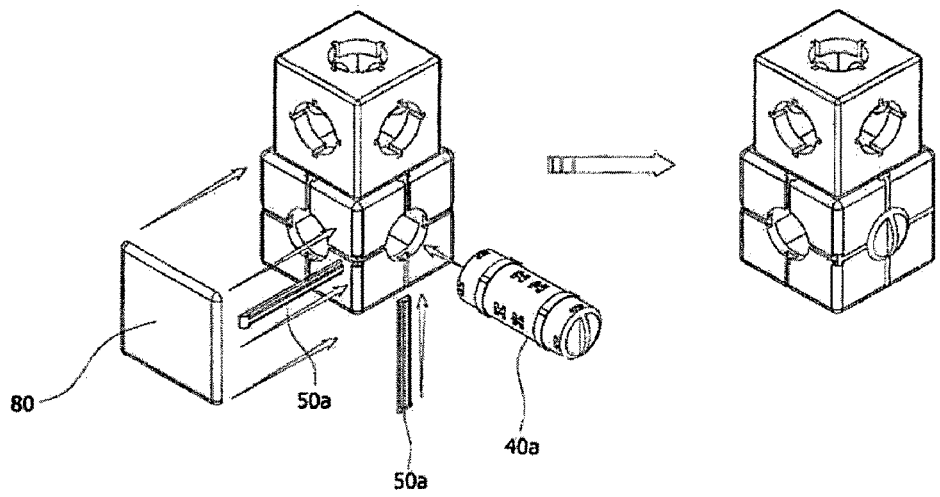
FIGS. 7 to 11 are views illustrating partial coupling of the unit block sample product and the auxiliary coupling components shown in FIGS. 5 and 6.

FIGS. 7 to 11 illustrate various examples of partial vertical and horizontal coupling implemented using the unit block 30 and the related auxiliary components shown in FIGS. 5 and 6. In FIG. 7, the auxiliary coupling pin 50a or the auxiliary coupling pin 50b may be fitted into the internally extended groove 22 formed in a "⊣" shape in the lower body of the unit block 30 shown in FIG. 1 to strengthen coupling. In addition, a cover 71 may be attached to one side wall of the lower body 20, and a unit coupling rod 41 is fitted into the coupling through hole 21 formed in the side wall of the lower body 20.

Figure 8:
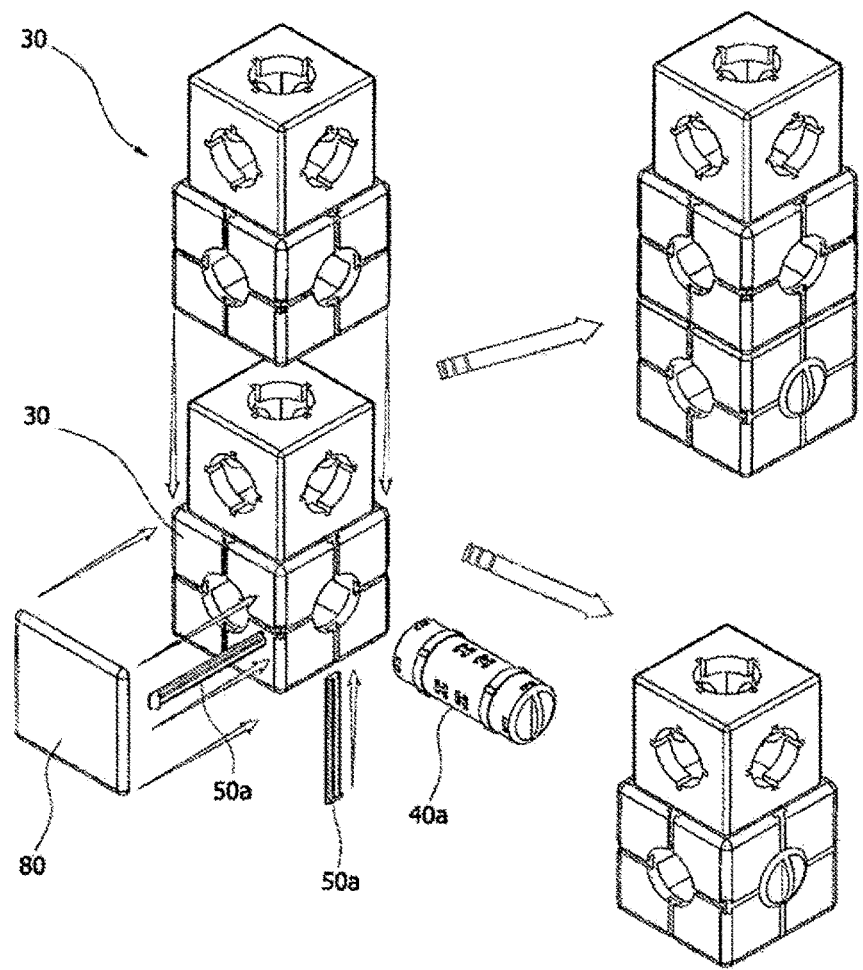

FIG. 8 shows fitting another unit block 30 onto the upper portion of the unit block 30 assembled as shown in FIG. 7 to form a coupled block shown at the upper right side of the figure.

Figure 9:
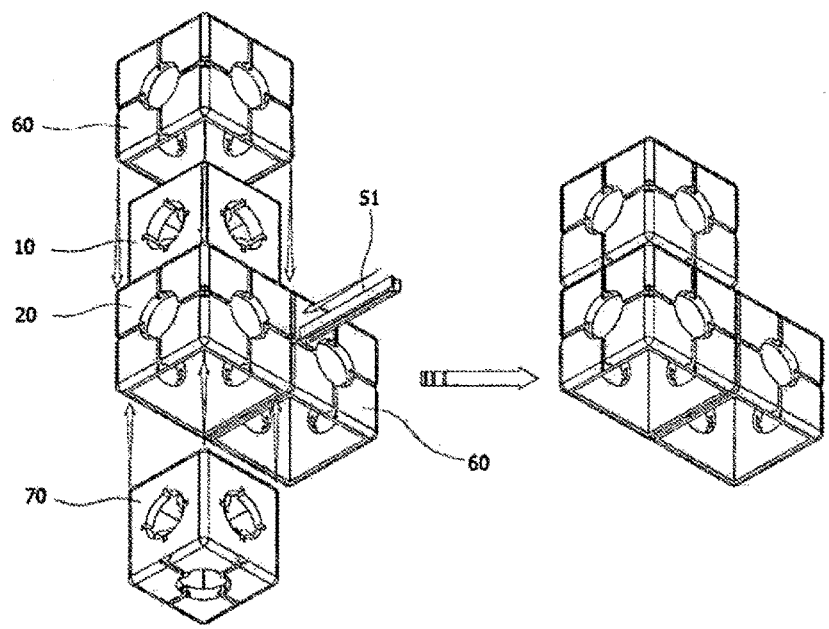

In FIG. 9, the upper finishing block 60 may be fitted onto the upper portion of the upper body 10 of the unit block 30 shown in FIG. 1, and the lower finishing block 70 may be fitted into the hollow portion 24 at the bottom of the lower body 20 of the unit block 30. When another unit block 30 is coupled to a side surface of the unit block 30, a coupling support segment 53 having an H-shape, which is formed by arrangement of a wide projecting segment 51, a narrow projecting segment 52 and a wide projecting segment 51 of the auxiliary coupling pin 50, is inserted into the internally extended grooves 22 which are provided in the lower bodies 20 of both unit blocks 30 and are formed in the "⊣" shape, thereby forming a coupling block shown on the right side of the figure.

Figure 10:
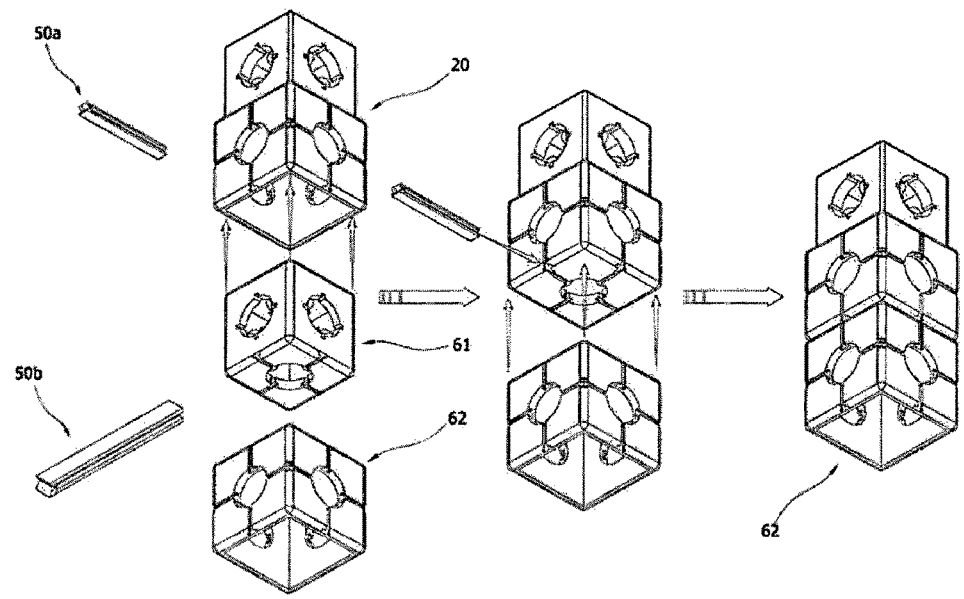

In FIG. 10, a lower finishing block 70 may be fitted into the hollow portion 24 at the bottom of the lower body 20 of the unit block 30 to be finishing, a separate outer finishing block 62 may be fitted to the unit block 30 and fixed using the "⊣"-shaped auxiliary coupling pin 50a or the H-shaped coupling support segment 50b.

Figure 11:
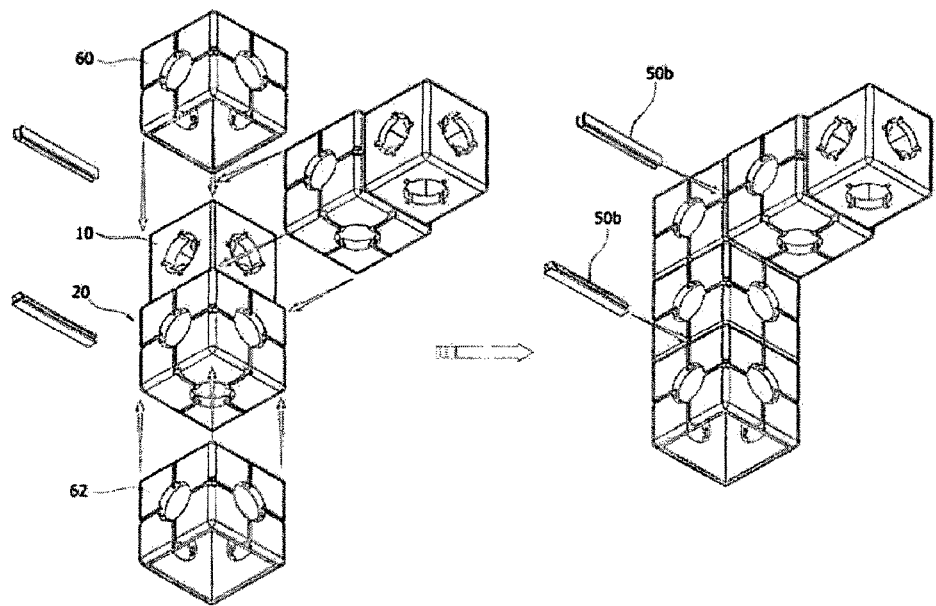

In the example of FIG. 11, after an upper finishing block 60 is fitted onto the upper body 10 of the unit block 30, another unit block 30' in a laid-down position can be coupled to the unit block 30. The two adjacent unit blocks can be coupled to each other by applying the H-shaped coupling segment 50b to the side surface of the upper finishing block 60 and the internally extended groove 22 of the other unit block 30'.

Base on the above-described principle, articles of various shapes can be realized using the unit block 30 and the coupling components thereof shown in FIGS. 5 to 11. FIGS. 12 to 20 illustrate articles of various shapes which can be constructed by students using the unit block 30 and the coupling components thereof according to the technical idea of the present invention and be used to play a game for fun in an educational setting.

Figure 12:
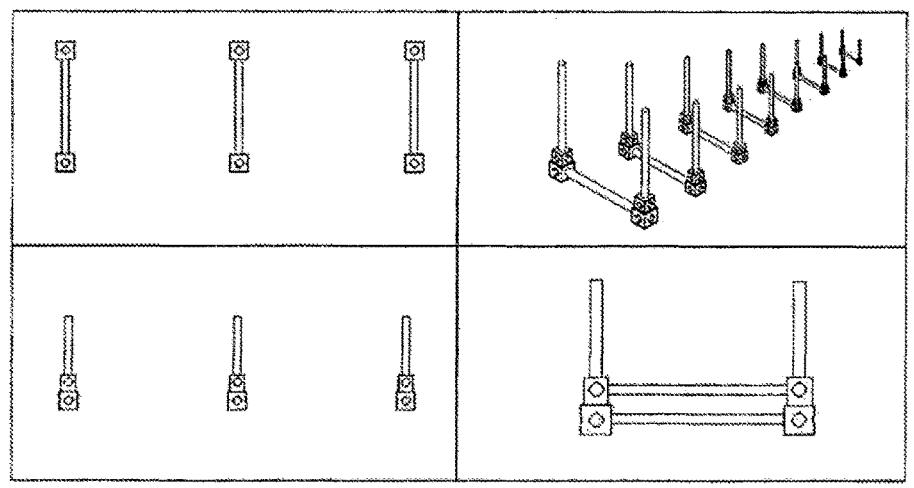
FIG. 12 is an exemplary view illustrating a conical assembly formed using a unit block and a coupling component to which the technical idea of the present disclosure is applied.

FIG. 12 shows an embodiment of a conical assembly that can be constructed by kindergarteners or elementary school students. Kindergarteners or elementary school students can be given the unit block 30 and necessary parts to which the technical idea of the present invention is applicable and be instructed to build a conical shape by arranging horizontal bars of different lengths. Then, the students can build and arrange high horizontal bars and low horizontal bars in order and play by running over the bars by distinguishing the heights of the bars. The upper left side of the figure shows a top plan view of the conical assembly, and the upper right side of the figure shows a perspective view in which a plurality of conical assemblies is arranged in order according to the heights thereof. The lower left side of the figure shows a side view of one conical assembly, and the lower right side of the figure shows a front view of a shape that can be formed by vertically stacking two horizontal bars.

Figure 13:
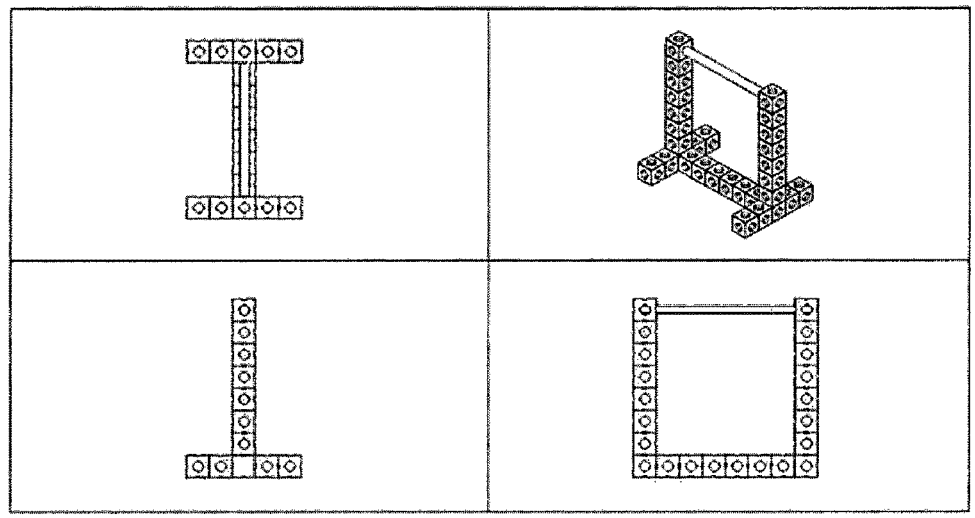
FIG. 13 is an exemplary view illustrating a chin-up bar assembly formed using a unit block and a coupling component to which the technical idea of the present disclosure is applied.

FIG. 13 is a view showing an embodiment of a chin-up bar assembly that can be constructed by a student of an elementary school used as a chin-up workout tool. The unit block 30 and its necessary parts can be provided to the elementary school students, and the students can be instructed to construct a chin-up bar assembly having a certain height. Then, the students can stack the unit blocks 30 to a certain height to form a vertical axis and a horizontal axis, and arrange a bar between the left and right vertical axes to form a horizontal bar structure for a chin-up workout. The upper left side of the figure shows a top plan view of the chin-up bar assembly, and the upper right side of the figure shows a perspective view of the chin-up bar assembly. The lower left side of the figure shows a side view of the chin-up bar assembly, and the lower right side of the figure shows a front view of the chin-up bar assembly formed with one horizontal bar.

Figure 14:
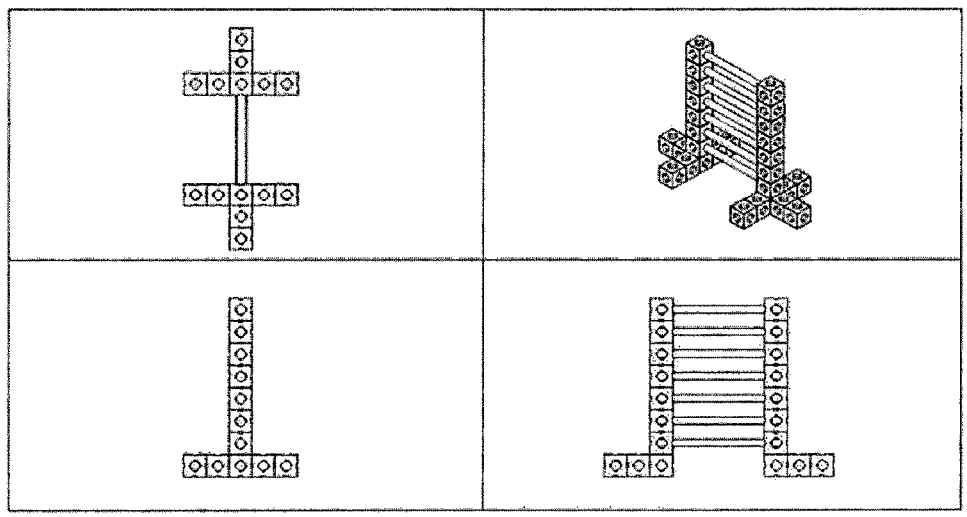
FIG. 14 is an exemplary view illustrating a ladder assembly formed using a unit block and a coupling component to which the technical idea of the present disclosure is applied.

FIG. 14 shows an embodiment of a ladder structure that can be constructed for elementary school students to play on. Elementary school students can be given the unit block 30 and necessary parts to which the technical idea of the present invention is applied and be instructed to construct a ladder of a stable structure by horizontally arranging multiple horizontal bars. Then, the students can build a ladder by arranging the horizontal bars at substantially constant intervals, and climb up and down the ladder. The upper left side of the figure shows a top plan view of the ladder assembly, and the upper right side of the figure shows a perspective view of the ladder assembly. The lower left side of the figure shows a side view of the ladder assembly, and the lower right side of the figure shows a front view of the ladder assembly.

Figure 15:
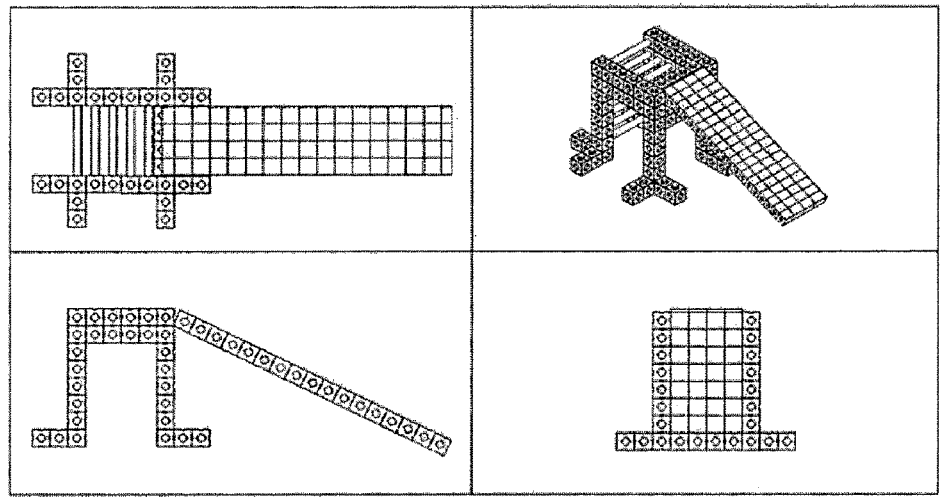
FIG. 15 is an exemplary view illustrating a slide assembly formed using a unit block and a coupling component to which the technical idea of the present disclosure is applied.

FIG. 15 shows an embodiment of a slide that can be constructed for kindergarteners or elementary school students to play on. Kindergarteners or elementary school students can be given the unit block 30 and necessary parts to which the technical idea of the present invention is applied and be instructed to construct a side assembly with one side positioned at a low level and the other side positioned at a high level. Then, the students can substantially construct a slide structure to play on. The upper left side of the figure shows a top plan view of the slide assembly, and the upper right side shows a perspective view of the slide assembly. The lower left side of the figure shows a side view of the slide assembly, and the lower right side of the figure shows a front view of the slide.

Figure 16:
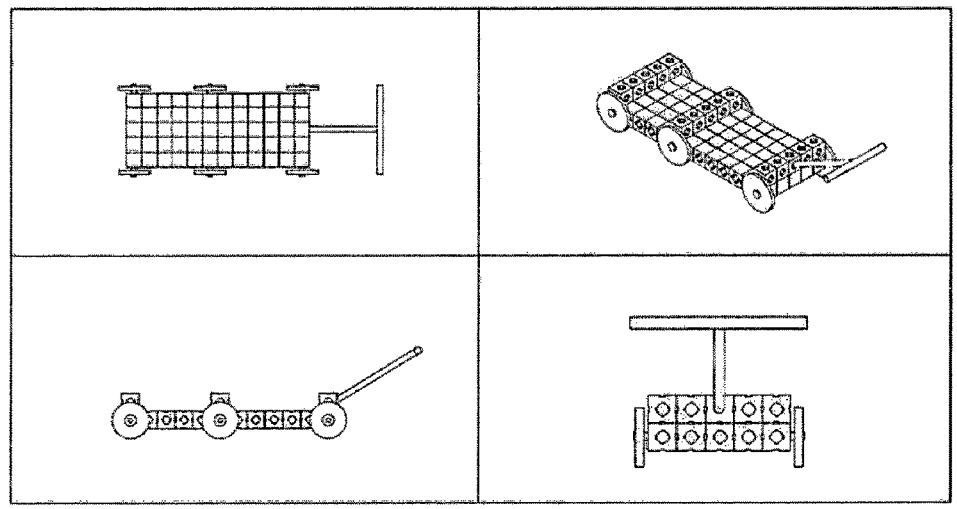
FIG. 16 is an exemplary view illustrating a cart assembly formed using a unit block and a coupling component to which the technical idea of the present disclosure is applied.

FIG. 16 shows an embodiment of a cart assembly which can be constructed for kindergarteners or elementary school students to ride on. Kindergarteners or elementary school students can be given the unit block 30 to which the technical idea of the present invention is applied and circular wheels as necessary parts and be instructed to construct a cart that can move back and forth. Then, the students can construct a cart that moves when pulled by hand and play by pulling the cart. The upper left side of the figure shows a top plan view of a cart assembly, and the upper right side of the figure shows a perspective view of the cart assembly. The lower left side of the figure shows a side view of the cart assembly and the lower right side of the figure shows a front view of the cart assembly.

Figure 17:
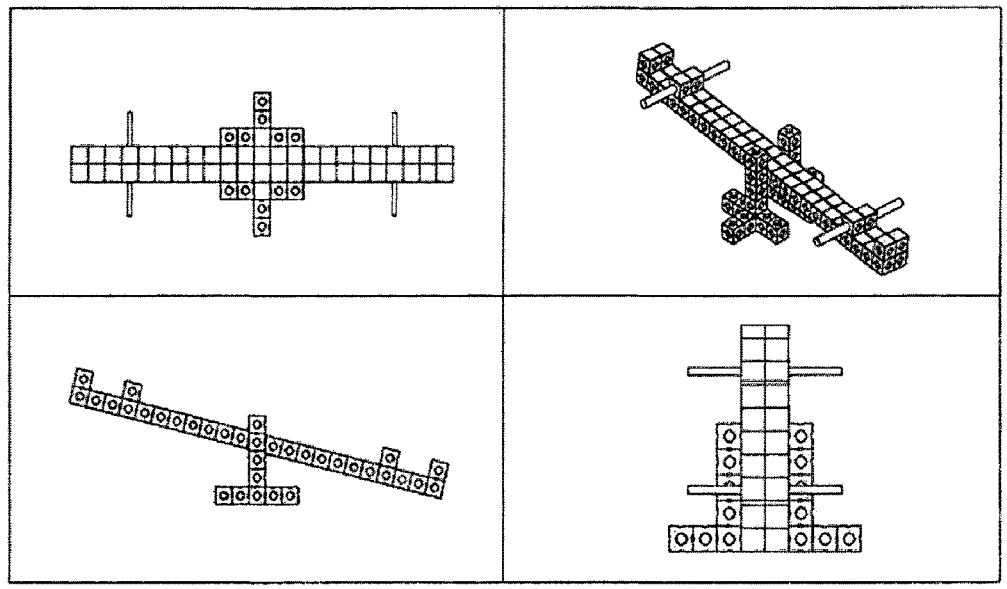
FIG. 17 is an exemplary view illustrating a seesaw game assembly formed using a unit block and a coupling component to which the technical idea of the present disclosure is applied.

FIG. 17 shows an embodiment of a seesaw game assembly that can be constructed for kindergarteners or elementary school students to play on. Kindergarteners or elementary school students can be given the unit block 30 and necessary parts to which the technical idea of the present invention is applied and be instructed to construct a seesaw that is balanced on a central axis thereof for the students to play a seesaw game thereon. Then, the students can construct a seesaw game assembly balanced about the central axis with their hands and learn the principle of balance. The upper left side of the figure shows a top plan view of the seesaw game assembly, and the upper right side of the figure shows a perspective view of the seesaw game assembly. The lower left side of the figure shows a side view of the seesaw game assembly, and the lower right side of the figure shows a front view of the seesaw game assembly.

Figure 18:
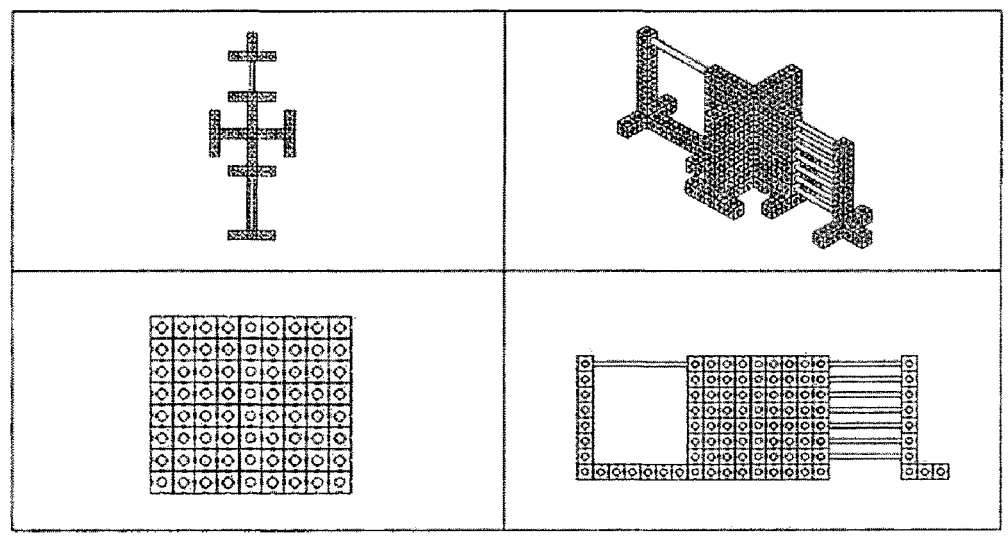
FIG. 18 is an exemplary view illustrating a complex workout mechanism assembly formed using a unit block and a coupling component to which the technical idea of the present disclosure is applied.

FIG. 18 is a view illustrating a complex workout mechanism assembly having a chin-up bar structure with one horizontal bar, a ladder provided with multiple horizontal bars, and a vertical wall structure for a rock climbing game. Elementary school students or middle school students can be given the unit blocks 30 to which the technical idea of the present invention is applied and be instructed to construct a complex workout mechanism having protrusions which are provided between the coupling through holes 21 of the unit blocks so as to be held by hand such that the students can climb up the vertical wall by stepping on or holding the protrusions using their feet or arms. Then, the students can construct a chin-up bar structure, a ladder structure, and a vertical structure for enjoying rock climbing. The upper left side of the figure shows a plan view of the complex workout mechanism assembly, and the upper left side of the figure shows a perspective view of the complex workout mechanism assembly. The lower right side of the figure shows a side view of the complex workout mechanism, and the lower right side of the figure shows a front view of the complex workout mechanism.

Figure 19:
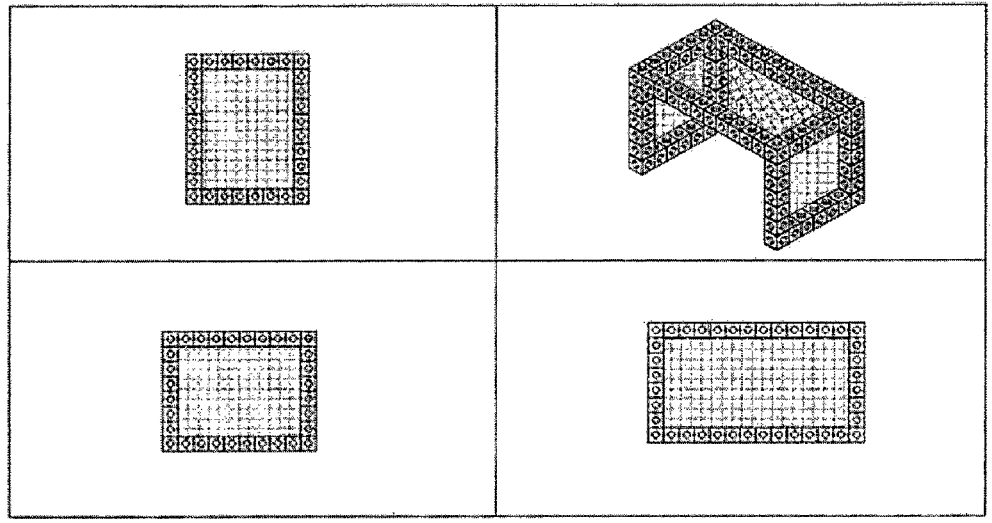
FIG. 19 is an exemplary view illustrating a soccer goal post assembly formed using a unit block and a coupling component to which the technical idea of the present disclosure is applied.

FIG. 19 shows an embodiment of a soccer goal post that can be constructed for kindergarteners or elementary school students to play a soccer game in an indoor or outdoor space. The kindergarteners or elementary school students can use the unit block 30 and necessary parts to which the technical idea of the present invention is applied to construct a laterally balanced goal post structure with a net installed around the goal post structure except the front of the goal post structure such that the students can play a soccer game. The upper right side of the figure shows a perspective view of a soccer goal post assembly, and the upper right side of the figure shows a perspective view of the soccer goal post assembly. The lower left side of the figure shows a side view of the soccer goal post assembly, and the lower right side of the figure shows a front view of the soccer goal post assembly.

Figure 20:
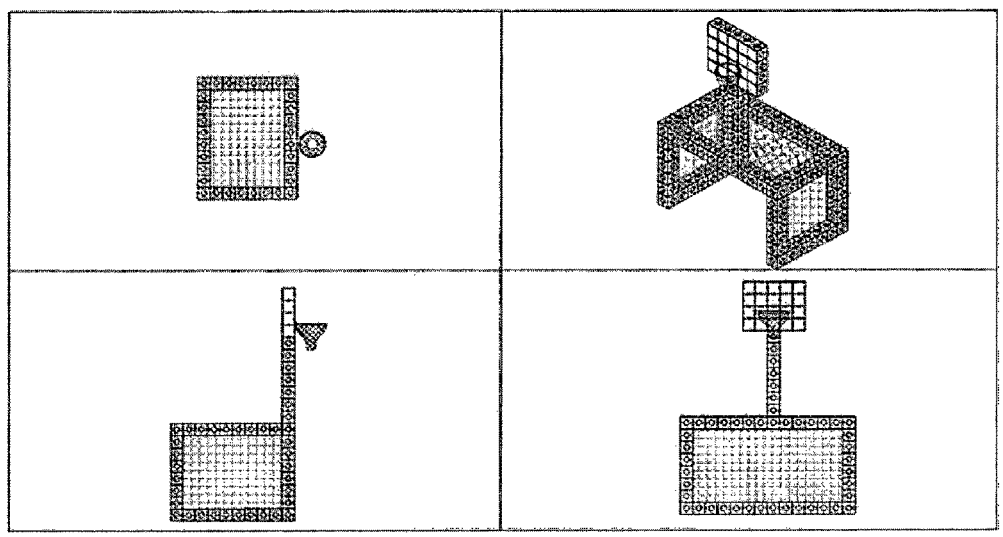
FIG. 20 is an exemplary view illustrating a basketball post assembly formed using a unit block and a coupling component to which the technical idea of the present disclosure is applied.

FIG. 20 shows an assembled article having a basketball post at the central portion of the soccer goal post assembly of FIG. 19. When the students become bored with the play assembly of FIG. 19 after playing with the paly assembly of FIG. 19, the students can stack unit blocks 30 on the central portion of the soccer goal post assembly of FIG. 19 to construct a basketball post having a backboard and a hoop in front of the backboard to play a basketball game of shooting a ball into the hoop.

Figure 21:
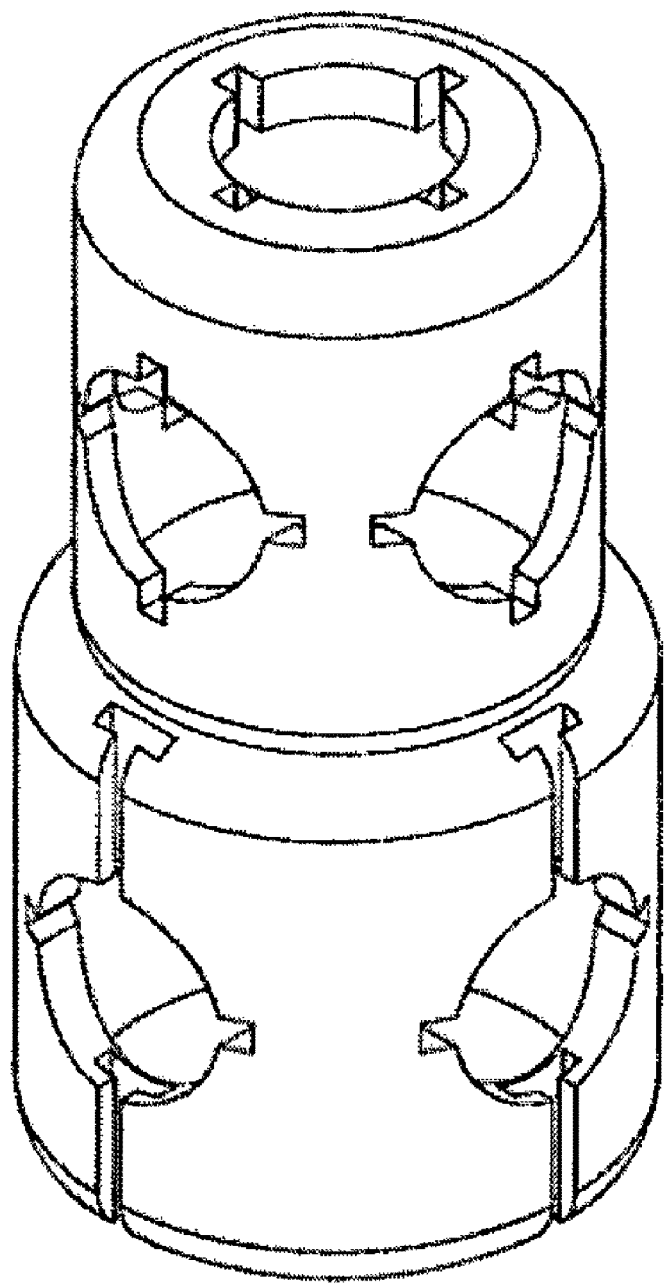
FIGS. 21 and 22 are exemplary views showing different shapes of a unit block to which the technical idea of the present disclosure is applied.
Figure 22:
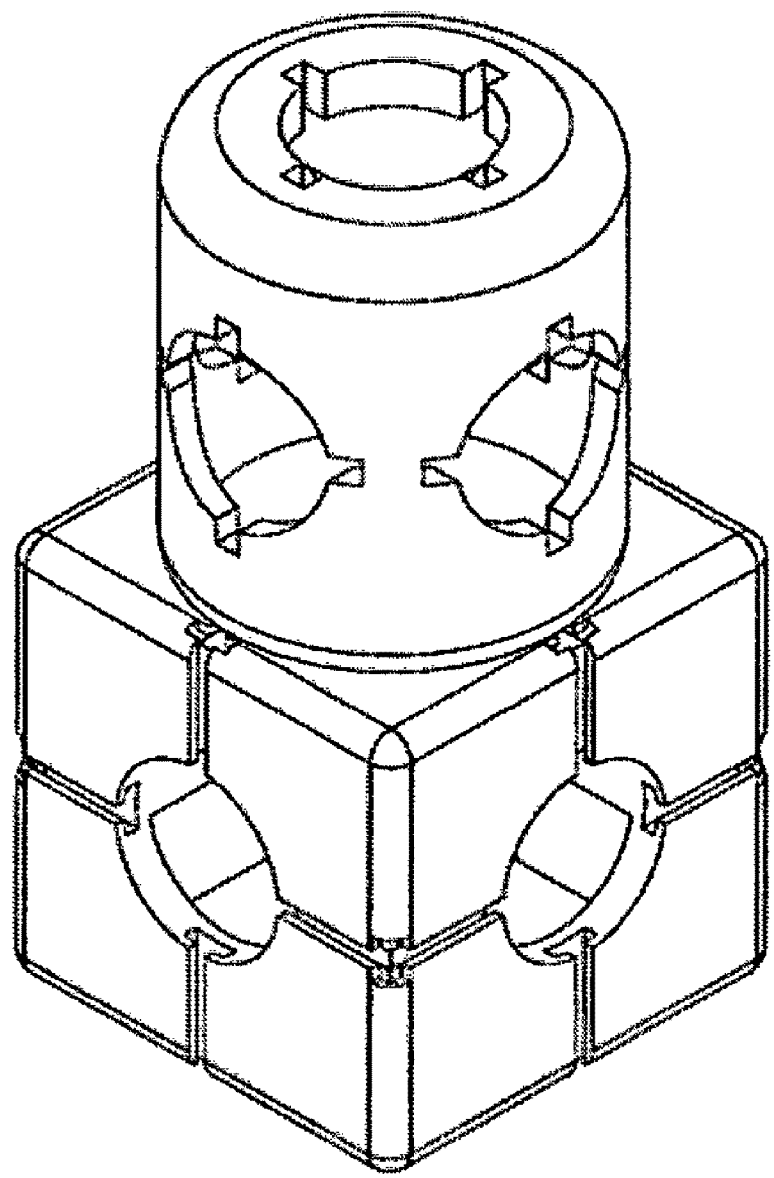

FIGS. 21 and 22 are views showing the structure of a unit block of the present invention having an insertion portion and the coupling portion which are integrally formed in various shapes other than the cubic shape shown in FIGS. 1 to 4. FIG. 21 is a view showing the insertion portion and the coupling portion, which are integrally formed in a cylindrical shape according to the technical idea of the present invention, of the unit block and FIG. 22 is a view showing a unit block of the present invention having a cylindrical insertion portion and the cubic coupling portion, wherein the insertion portion is integrally fitted into the upper end of the coupling portion by being narrowed by the thickness of the outer wall of the coupling portion, the four side surfaces of the coupling portion and the insertion portion are provided with a coupling through hole, which has a partially expanded tubular portion on the upper, lower, left and right sides, and an internally extended groove is formed in the central portion of the outer wall surface of the coupling portion such that the central portion of the outer wall surface of the coupling portion is provided with an internally extended groove such that a coupling support rod is fitted into the coupling through hole and an auxiliary coupling pin is fitted into the internally extended groove to implement secure coupling.

Figure 23:
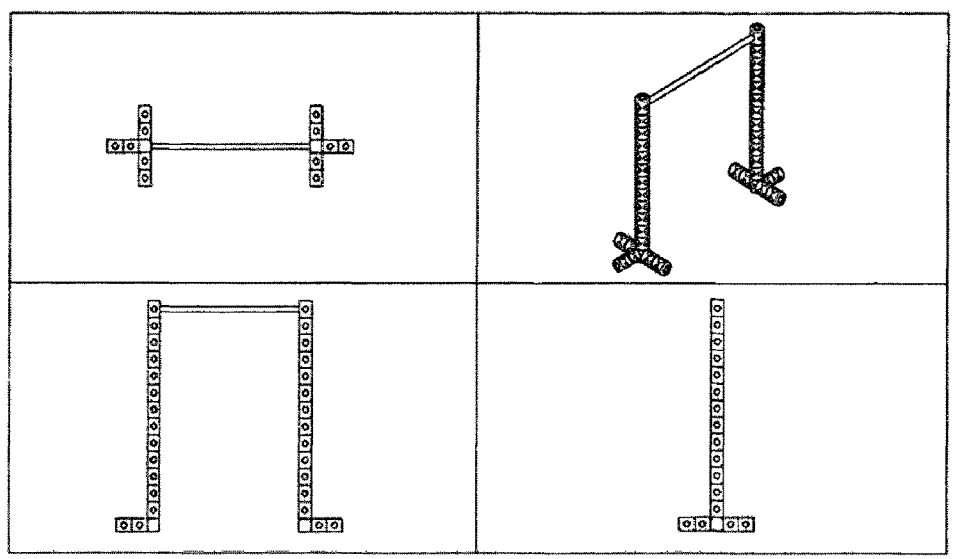
FIG. 23 is an exemplary view illustrating a chin-up workout assembly formed using the unit block shown in FIG. 21.

FIG. 23 shows an embodiment of a chin-up workout assembly having the same shape as the chin-up workout assembly of FIG. 13. While the chin-up workout assembly of FIG. 13 is formed by a unit block structure in which the insertion portion and coupling portion both have a cubic shape and are integrated with each other, the chin-up workout assembly of FIG. 23 is formed by a unit block structure in which the insertion portion and coupling portion both have a cylindrical shape and are integrated with each other as shown in FIG. 21. In the figure, the upper left side shows a top plan view of the chin-up workout assembly, and the upper right side shows a perspective view of the chin-up workout assembly. The lower left side shows a front view of the chin-up workout assembly, and the lower right side shows a side view of the chin-up workout assembly.

According to embodiments of the present invention described above, for example, kindergarteners, elementary school students or high school students can not only construct workout assemblies and articles of various shapes as desired by the users using the unit block 30 and related coupling components provided herein, but also utilize the same in playing in an area. Thereby, the students' interest in an education course can be enhanced, and the students can be physically strengthened.

In addition, for the youth, the unit block and related coupling components of the present invention can be used as building blocks for making a climbing wall, and can also be used to construct other structures, furniture, equipment, or vehicles. It is to be understood that the technical idea presented herein may be applied to various applications other than the embodiments shown in FIGS. 7 to 17, and therefore the claims of the present application should be construed equivalently and be protected.

The invention claimed is:

1. A unit block assembly for assembling desired stacking objects, comprising:
   a first unit block that includes a first coupling portion and a first insertion portion integrally formed on an upper portion of the first coupling portion, the first insertion portion and the first coupling portion being integrally formed such that the first insertion portion is formed to have a narrowed size by a thickness of an outer wall of the first coupling portion; and
   a second unit bock that includes a second coupling portion and a second insertion portion integrally formed on an upper portion of the second coupling portion, the second insertion portion and the second coupling portion being integrally formed such that the second insertion portion is formed to have a narrowed size by a thickness of an outer wall of the second coupling portion,
   wherein each of the first insertion portion and the second insertion portion is configured to be fitted into an inner side of each of the second coupling portion and the first coupling portion, and to be integrally fitted on an upper end of each of the second coupling portion and the first coupling portion, wherein each of the first coupling portion and the second coupling portion and each of the first insertion portion and the second insertion portion have four side surfaces, and the four side surfaces are provided with a coupling through hole, wherein a partially expanded tubular portion is formed on upper, lower, left, and right sides of the coupling through hole, wherein an internally extended groove is formed in a central portion of an outer surface of each of the first coupling portion and the second coupling portion such that a coupling support rod is fitted into the coupling through hole, and wherein an auxiliary coupling pin is configured to be fitted into the internally extended groove.

2. The unit block assembly according to claim 1, further comprising an auxiliary coupling pin, wherein the internally extended groove is formed in a T shape, and wherein the auxiliary coupling pin is configured to be fitted into the T-shaped internally extended groove when the first unit block is vertically coupled to the second unit block.

3. The unit block assembly according to claim 1, further comprising an H-shaped coupling support segment, wherein the H-shaped coupling support segment is configured to be inserted into the internally extended grooves of the first unit block and the second unit block such that the first unit block is vertically coupled to the second unit block.

4. The unit block assembly according to claim 1, further comprising a support rod having a partially projecting portion formed on a surface thereof, wherein the coupling through hole has a partial protrusion groove formed on upper, lower, left, and right sides thereof, and wherein the partially projecting portion formed on the surface of the support rod is configured to be fitted into the partial protrusion groove formed in the coupling through hole of the coupling portion.

* * * * *

UNITED STATES PATENT AND TRADEMARK OFFICE
CERTIFICATE OF CORRECTION

PATENT NO.       : 10,272,353 B2
APPLICATION NO.  : 15/575382
DATED            : April 30, 2019
INVENTOR(S)      : Seung Young Oh Page 1 of 1

It is certified that error appears in the above-identified patent and that said Letters Patent is hereby corrected as shown below:

On the Title Page

In Item (22), delete "Nov. 24, 2016" and insert -- Apr. 29, 2016 --, therefor.

Signed and Sealed this
Second Day of July, 2019

Andrei Iancu
*Director of the United States Patent and Trademark Office*